US010372905B1

(12) United States Patent
McClintock et al.

(10) Patent No.: US 10,372,905 B1
(45) Date of Patent: Aug. 6, 2019

(54) PREVENTING UNAUTHORIZED SOFTWARE EXECUTION

(71) Applicant: AMAZON TECHNOLOGIES, INC., Seattle, WA (US)

(72) Inventors: Jon Arron McClintock, Seattle, WA (US); Darren Ernest Canavor, Redmond, WA (US); George Nikolaos Stathakopoulos, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 27 days.

(21) Appl. No.: 14/569,265

(22) Filed: Dec. 12, 2014

(51) Int. Cl.
*G06F 21/56* (2013.01)

(52) U.S. Cl.
CPC ............ *G06F 21/56* (2013.01); *G06F 21/566* (2013.01); *G06F 2221/033* (2013.01)

(58) Field of Classification Search
CPC ... G06F 21/564; G06F 21/566; H04L 63/145; H04W 36/0033; H04W 36/0038; H04M 1/72569
USPC ......................................................... 726/23
See application file for complete search history.

(56) References Cited

U.S. PATENT DOCUMENTS

| 2003/0145226 | A1* | 7/2003 | Bruton, III | .......... | H04L 63/1408 726/22 |
| 2006/0075504 | A1* | 4/2006 | Liu | ...................... | G06F 11/2294 726/25 |
| 2013/0227691 | A1* | 8/2013 | Aziz | ...................... | G06F 21/567 726/24 |
| 2015/0101048 | A1* | 4/2015 | Sridhara | .................. | G06F 21/55 726/23 |
| 2015/0150130 | A1* | 5/2015 | Fiala | ....................... | G06F 21/56 726/23 |

* cited by examiner

*Primary Examiner* — Alexander Lagor
*Assistant Examiner* — William B Jones
(74) *Attorney, Agent, or Firm* — Lindauer Law, PLLC

(57) ABSTRACT

Techniques are described for preventing a software module from executing in an unauthorized environment. A software module may be configured to collect context information that describes an environment in which the software module is executing. If the context information indicates that the environment is unauthorized for executing the software module, the software module may alter its behavior(s) or its binary signature to simulate a threat. Threat detection module(s), such as anti-virus software, anti-malware software, and so forth, may then identify the software module as a threat and disable its execution or perform other actions. In some cases, the analysis of the context information may be performed on server device(s), which may send a signal to cause the software module to alter its behavior(s) or its binary signature.

20 Claims, 9 Drawing Sheets

US 10,372,905 B1

PREVENTING UNAUTHORIZED SOFTWARE EXECUTION

BACKGROUND

Providers of online services or other computing services may deploy a large number of computing devices that execute a large number of software modules including applications, libraries, interfaces, and so forth. A complex computing environment that includes many computing devices and software modules may create challenges for ensuring the security, confidentiality, and integrity of the information processed by the computing devices. In some cases, malicious individuals or processes may attempt to employ a software module in an unauthorized manner to gain access to data, devices, or other software modules.

Certain implementations and embodiments will now be described more fully below with reference to the accompanying figures in which various aspects are shown. Aspects may be implemented in many different forms and should not be construed as limited to the implementations set forth herein. Like numbers refer to like elements throughout this disclosure.

DETAILED DESCRIPTION

This disclosure describes implementations of systems, devices, methods, and computer-readable media for preventing a software module from executing on a host device in an unauthorized environment. A business or other organization may develop and provide executable software modules, such as applications, libraries, interfaces, and so forth, to be used by authorized customers, clients, or other entities. In some cases, the organization that provided a software module may seek to prevent the software module from being used in an unauthorized environment or for an unauthorized purpose. For example, an organization may create a software module that is configured to authenticate users, and the organization may provide the software module to one or more business customers (e.g., online merchants) for their authorized use. If one or more malicious individuals were to gain access to the software module, such individuals could attempt to use the software module to attack or otherwise compromise other services provided by the organization.

Implementations may prevent a software module from being executed on an unauthorized host device, or in an unauthorized environment, to reduce the likelihood that the software module may be used in an unauthorized manner. A software module may be configured to collect, at runtime, context information that describes an environment in which the software module is executing. Such context information may describe a hardware configuration of the host device on which the software module is executing, a software configuration of the host device, network(s) accessible from the host device, a domain of the host device, other device(s) accessible from the host device, or other information. The software module may analyze the context information to determine an environment in which the software module is executing. If the environment is determined to be unauthorized for executing the software module, the software module may execute one or more defensive instructions that alter the software module to simulate a threat. Threat detection module(s) executing in the environment, such as anti-virus software, anti-malware software, and the like, may then identify the software module as a threat and disable its execution. In some cases, the analysis of the context information may be performed on server device(s), which may send a signal to cause the software module to simulate the threat. Accordingly, implementations provide for a set of defensive measures that leverage threat detection module(s) to prevent unauthorized execution of a software module.

Figure 1:
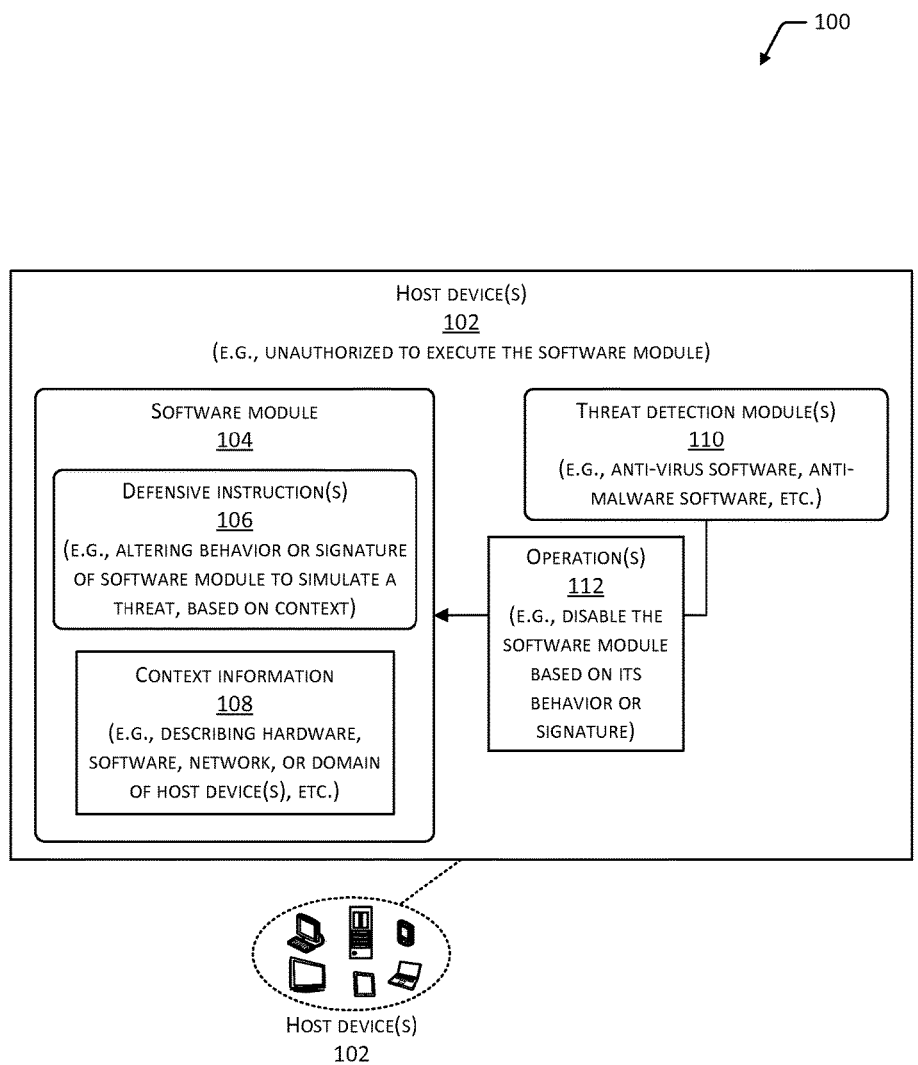
FIG. 1 depicts an environment for preventing a software module from executing in an unauthorized environment by configuring the software module to simulate a threat that is disabled by threat detection module(s) such as anti-virus software, anti-malware software, and so forth.

FIG. 1 depicts an environment 100 in which implementations may operate. As shown in FIG. 1, the environment 100 may include one or more host devices 102. The host device(s) 102 may comprise any type of computing device, including but not limited to a network computer, a server computer, a mainframe computer, a distributed computing device (e.g., a cloud server), a personal computer, a smartphone, a tablet computer, a wearable computer, an implanted computer, a mobile gaming device, an electronic book (e-book) reader, an automotive computer, a desktop computer, a laptop computer, a game console, a home entertainment device, and so forth. Although examples herein may describe the host device(s) 102 as physical device(s), implementations are not so limited. In some cases, the host device(s) 102 may include one or more of a virtual computing environment, a hypervisor, an emulation, or a virtual machine executing on one or more physical computing devices. In some cases, two or more of the host devices 102 may comprise a cluster, cloud, farm, or other grouping of multiple devices that coordinate operations to provide load balancing, failover support, parallel processing capabilities, shared storage resources, or other aspects. The host device(s) 102 are described further with reference to FIG. 4.

The host device(s) 102 may include a software module 104. In some cases, the software module 104 may include one or more executable modules such as an application, executable library, application programming interface (API), another type of executable interface, class, object, program, and so forth. The software module 104 may execute in the active, runtime (e.g., physical) memory of the host device(s) 102. The software module 104 may provide any type of functionality, and may include or not include user interface (UI) elements.

In some cases, the source code of the software module 104 may be written in a programming language that compiles to machine-executable binary code, such as C, C++, Objective-C, and so forth. In such cases, the source code may be compiled, linked, or otherwise built to generate the software module 104 as including any number of machine-executable instructions that execute on the processor(s) and within the operating system (OS) of the host device(s) 102. In some cases, the source code of the software module 104 may be written in a programming language that compiles to an intermediate language (e.g., bytecodes), such as Java, C#, and so forth. In such cases, the source code may be compiled, linked, or otherwise built to generate the software module 104 as including any number of executable instructions (e.g., bytecode instructions) that execute within a runtime application such as a Java Virtual Machine (JVM), C#runtime, or any other runtime, interpreter, virtual machine, or execution engine. In some cases, the software module 104 may include any number of executable instructions in a scripting language or interpreted language, such as JavaScript, ActiveScript, VBScript, Perl, and so forth. In such cases, the software module 104 may execute within a runtime application such as a runtime, interpreter, virtual machine, scripting engine, and so forth.

In some cases, the software module 104 may be a web application configured to execute, at least partly, in a web browser or other container for the presentation of web content, such as a WebView or UIWebView class. Accordingly, the software module 104 may include dynamic scripting or programmatic elements described using any programming language, such as JavaScript, ActiveScript, VBScript, Perl, and so forth. Implementations support the use of any web browser to execute the software module 104, including but not limited to one or more of the following: Mozilla Firefox; Microsoft Internet Explorer; Google Chrome; Apple Safari; Rockmelt; and so forth. Implementations also support the use of a web browser, such as the Amazon Silk browser, in which the processing of content is performed partly on the host device(s) 102 and partly on other computing device(s). In cases where the software module 104 is to be presented, at least partly, within a web browser or other container for the presentation of web content, the software module 104 may include any number of web pages that are described at least in part using a markup language such as any version of Hypertext Markup Language (HTML), Dynamic HTML (DHTML), Extensible HTML (XHTML), Extensible Markup Language (XML), and so forth.

The software module 104 may be configured to include one or more defensive instructions 106. The defensive instruction(s) 106 may be executable instruction(s) that alter the signature, behavior(s), or other aspects of the software module 104. In some implementations, the defensive instruction(s) 106 may execute to alter the behavior(s), the signature, or some other aspect of the software module 104 to simulate a threat such as a computer virus, malware, a bot, a worm, and so forth. In cases where the software module 104 is compiled, linked, or otherwise built from source code, the defensive instruction(s) 106 may include executable instruction(s) that are built from code that is written into the source code of the software module 104. Alternatively, the defensive instruction(s) 106 may be linked or otherwise incorporated into the software module 104 during a build process. In cases where the software module 104 is written in a scripting language, the defensive instruction(s) 106 may also be written in the scripting language.

In some implementations, the defensive instruction(s) 106 may have access to context information that describes a context of the host device(s) 102 on which the software module 104 is executing, or a context of the environment 100 that includes the host device(s) 102. The context information 108 may include information regarding the hardware configuration of the host device(s) 102, the software configuration of the host device(s) 102, the network(s) accessible from the host device(s) 102, the other device(s) that are accessible from the host device(s) 102 over the network(s), the domain(s) that include the host device(s) 102, or other information. In some implementations, the context information 108 may be generated by the defensive instruction(s) 106 or some other portion of the software module 104. Alternatively, the context information 108 may be generated by another process executing on the host device(s) 102 or within the environment 100. The context information 108 is described further with reference to FIG. 3.

The defensive instruction(s) 106 may employ the context information 108 to determine the environment in which the software module 104 is executing. In some cases, the defensive instruction(s) 106 may determine that the software module 104 has been deployed to, and is executing within, an environment that is unauthorized for the execution of the software module 104. This determination may be based on comparing at least a portion of the context information 108 to other (e.g., known good) context information 108 describing an authorized environment. For example, the context information 108 may indicate that the host device(s) 102 have access to network(s) or other device(s) that are not present in an authorized environment. Alternatively, the context information 108 may indicate that the host device(s) 102 do not have access to network(s) or other device(s) that are present in an authorized environment. As another example, the context information 108 may indicate that the host device(s) 102 have a hardware configuration, software configuration, or domain membership that does not correspond to the configuration(s) or domain(s) of host device(s) 102 in an authorized environment. In such cases, the defensive instruction(s) 106 may infer that the host device(s) 102 are included in an unauthorized environment for executing the software module 104.

In some cases, authorized host device(s) 102 may include module(s), file(s), or other data that indicates that the host device(s) 102 are authorized to execute the software module 104. If the context information 108 indicates that the module(s), file(s), or other data are not present on the host device(s) 102, the defensive instruction(s) 106 may infer that the environment is unauthorized. In some implementations, the defensive instruction(s) 106 may attempt to communicate with another computing device that is included in an authorized environment. If the attempted communication is unsuccessful, the defensive instruction(s) 106 may infer that the environment is unauthorized.

Based on a determination that the environment is unauthorized for executing the software module 104, the defensive instruction(s) 106 may perform one or more operations to modify the software module 104 or the behavior(s) of the software module 104. In some implementations, the modifications may include altering at least a portion the signature (e.g., binary signature or footprint) of the executable software module 104 to correspond to a portion of the signature of a virus, malware, or some other malicious software that is detectable as a threat. Such altering may include incorporating, into the software module 104, one or more additional executable instructions that correspond to instruction(s) present in malicious software. Altering may also include incorporating, into the software module 104, one or more sequences of data such as alphanumeric strings, binary data, or other portions of data that are present in malicious software. For example, altering may include incorporating into the software module 104 an internet protocol (IP) address, Uniform Resource Locator (URL), or other network address of a host or site that is known to be associated with malicious activity such as a botnet site, phishing site, or other blacklisted network location.

In some implementations, based on a determination that the environment is unauthorized for executing the software module 104, the defensive instruction(s) 106 may execute to alter the software module 104 by modifying one or more behaviors of the software module 104. The modified behaviors may mimic, imitate, or otherwise correspond to behavior(s) that are characteristics of a virus, malware, or other malicious software. The behavior(s) may include, but are not limited to, one or more of the following:

Attempting to connect to or otherwise access previously identified and quarantined network sites associated with malware, illicit data collection, phishing, botnets, or other malicious or illicit activities;

Performing network scans, performing port scans, checking for domain membership, or performing other suspicious scans of the host device(s) 102;

Probing or otherwise searching for data to access on the host device(s) 102 or other network-accessible device(s), such as data that is sensitive, personal, confidential, or otherwise secured;

Attempting to access data that may enable an attacker to spread to other systems, such as address book data, contacts data, routing tables, domain membership lists, and so forth;

Attempting to access security credentials such as certificates, cryptographic keys, tokens, or passwords, or attempting to access other security-related information;

Attempting to use geolocation or other methods to determine a location of the host device 102 based on its IP address or other information;

Attempting to perform (e.g., prohibited) system calls on the host device(s) 102; Attempting data access operation(s) on the host device(s) 102, including writes to disk or modification of stored data;

Attempting to overwrite or otherwise access system data or executable system module(s) on the host device(s) 102 or other device(s);

Attempting to modify or otherwise access one or more threat detection modules 110 present on the host device(s) 102, such as anti-virus software, anti-malware software, and so forth;

Attempting to delete data stored on the host device(s) 102;

Attempting to change one or more privileges of the software module 104 on the host device(s) 102, such as escalating a privilege to enable the software module 104 to access, modify, or delete data, install other programs, perform kernel-level operations, or perform other operations otherwise barred to the software module 104;

Attempting to change one or more user privileges of one or more users on the host device(s) 102, such as escalating the privilege of a user to root or administrator status, or enabling a user to access, modify, or delete data, install other programs, request kernel-level operations, or perform other actions otherwise barred to the user;

Attempting to access processes that are executing or executable on the host device(s) 102;

Attempting to connect to one or more external devices over one or more networks; or Attempting to modify a system configuration of the host device(s) 102, such as modifying installed drivers on the host device(s) 102.

The host device(s) 102 may execute the threat detection module(s) 110. The threat detection module(s) 110 may include, but are not limited to, one or more of the following: anti-virus software module(s); anti-malware software module(s); firewall(s) or other network security program(s); or intrusion detection system(s). An intrusion detection system may monitor network activities, or activities on the host device(s) 102, to identify unauthorized access by users or processes, malicious activities, policy violations, and so forth. In response to the modification of the signature or the behavior(s) of the software module 104, the threat detection module(s) 110 may identify the software module 104 as a potential threat and perform one or more operations 112 to disable the software module 104. Such operation(s) 112 may include, but are not limited to: quarantining the software module 104 to limit its network access or its access to data or processes on the host device(s) 102; terminating the execution of the software module 104; or deleting the software module 104. The operation(s) 112 may also include sending an alert or some other notification to prompt operator(s) to disable, delete, quarantine, or perform other actions. Accordingly, implementations may leverage the threat detection module(s) 110 currently present and executing on a host device 102 to prevent use of a software module 104 when the software module 104 determines that it is in an unauthorized environment.

Figure 2:
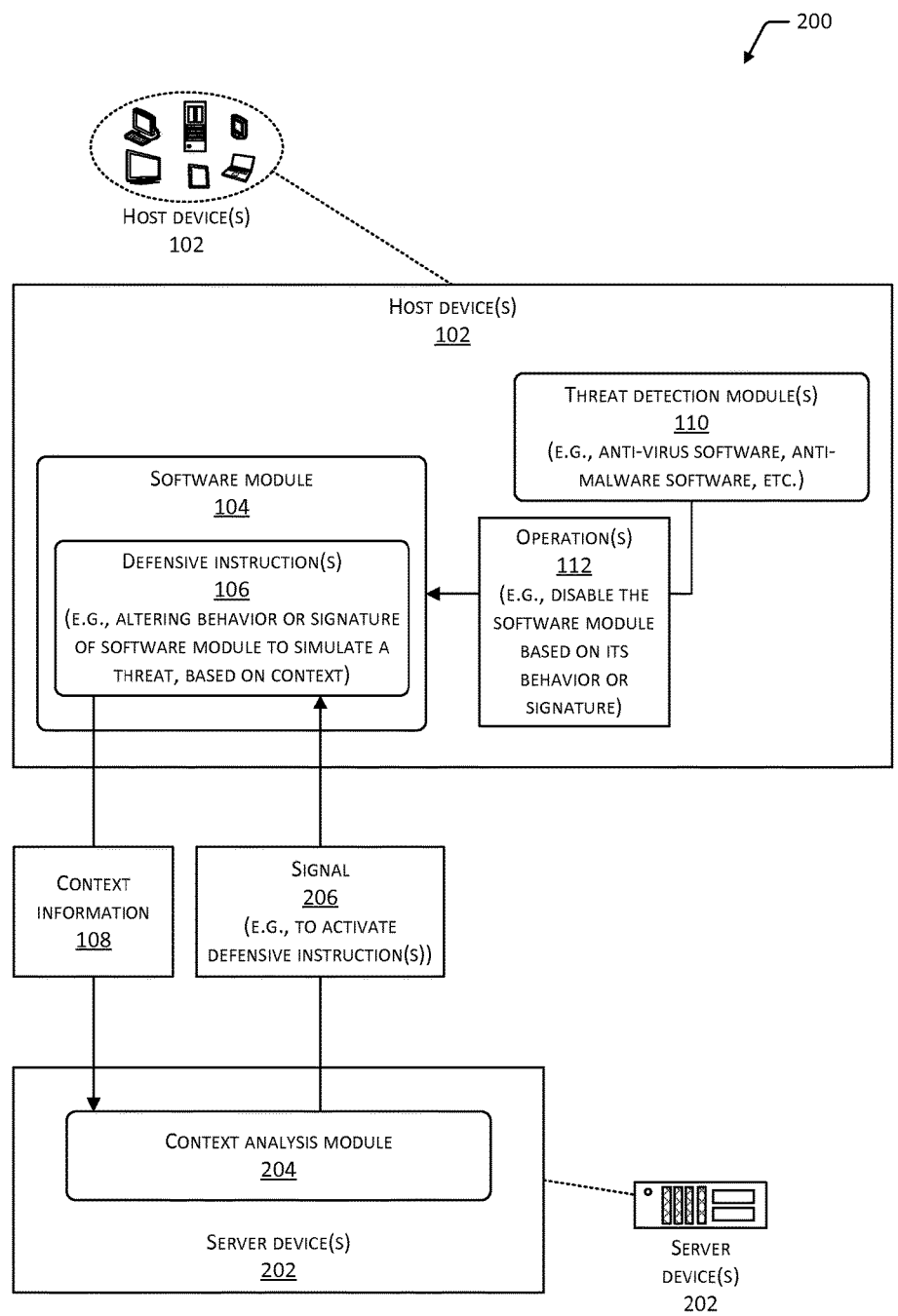
FIG. 2 depicts an environment for preventing a software module from executing in an unauthorized environment, in which the software module simulates a threat in response to a signal sent from server device(s).

FIG. 2 depicts an environment 200 in which implementations may operate. The elements depicted in FIG. 2 may be similarly configured, or perform similar operations, to like-numbered elements depicted in FIG. 1. The environment 200 may include one or more server devices 202. The server device(s) 202 may include any type of computing device, including but not limited to the types of devices described above with reference to the host device(s) 102. Although examples herein may describe the server device(s) 202 as physical device(s), implementations are not so limited. In some cases, the server device(s) 202 may include one or more of a virtual computing environment, a hypervisor, an emulation, or a virtual machine executing on one or more physical computing devices. In some cases, two or more of the server devices 202 may comprise a cluster, cloud, farm, or other grouping of multiple devices that coordinate operations to provide load balancing, failover support, parallel processing capabilities, shared storage resources, or other aspects. The server device(s) 202 are described further with reference to FIG. 5. The server device(s) 202 may execute a context analysis module 204.

In implementations illustrated by FIG. 2, the defensive instruction(s) 106, or another portion of the software module 104, may generate the context information 108 during execution of the software module 104 on the host device(s) 102. The context information 108 may be communicated over one or more networks (not shown) to the context analysis module 204 on the server device(s) 202. The context analysis module 204 may analyze the context information 108 and determine, based on the analysis, whether the software module 104 is executing in an authorized environment or an unauthorized environment. If the context information 108 indicates that the software module 104 is executing in an unauthorized environment, the context analysis module 204 may cause a signal 206 to be sent to the defensive instruction(s) 106. The signal 206 may activate the defensive instruction(s) 106. The defensive instruction(s) 106 may then execute, as described above, to alter the signature or the behavior(s) of the software module 104 and cause the threat detection module(s) 110 to perform the operation(s) 112 to disable the software module 104.

The various devices of the environments 100 and 200 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, the communications between the various devices in the environments 100 and 200 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

An authorized environment may include any number of host device(s) 102 that are authorized to execute the software module 104. In some cases, the authorized environment may be determined by network or domain administrators, developers, testers, managers, or other personnel within an organization that develops and provides the software module 104. In some cases, the authorized environment may include one or more host devices 102 that are part of a domain or connected over a network that is associated with the organization. The authorized environment may also include host device(s) 102 that are part of a domain or connected over a network that is associated with authorized parties such as a client, a customer, a vendor, or an affiliate of the organization that provided the software module 104. In some cases, an authorized environment may be an environment that is secured against outside access by a network firewall or via other means. An unauthorized environment may include any number of unauthorized host device(s) 102 or other devices that operate outside of an authorized environment.

Figure 3:
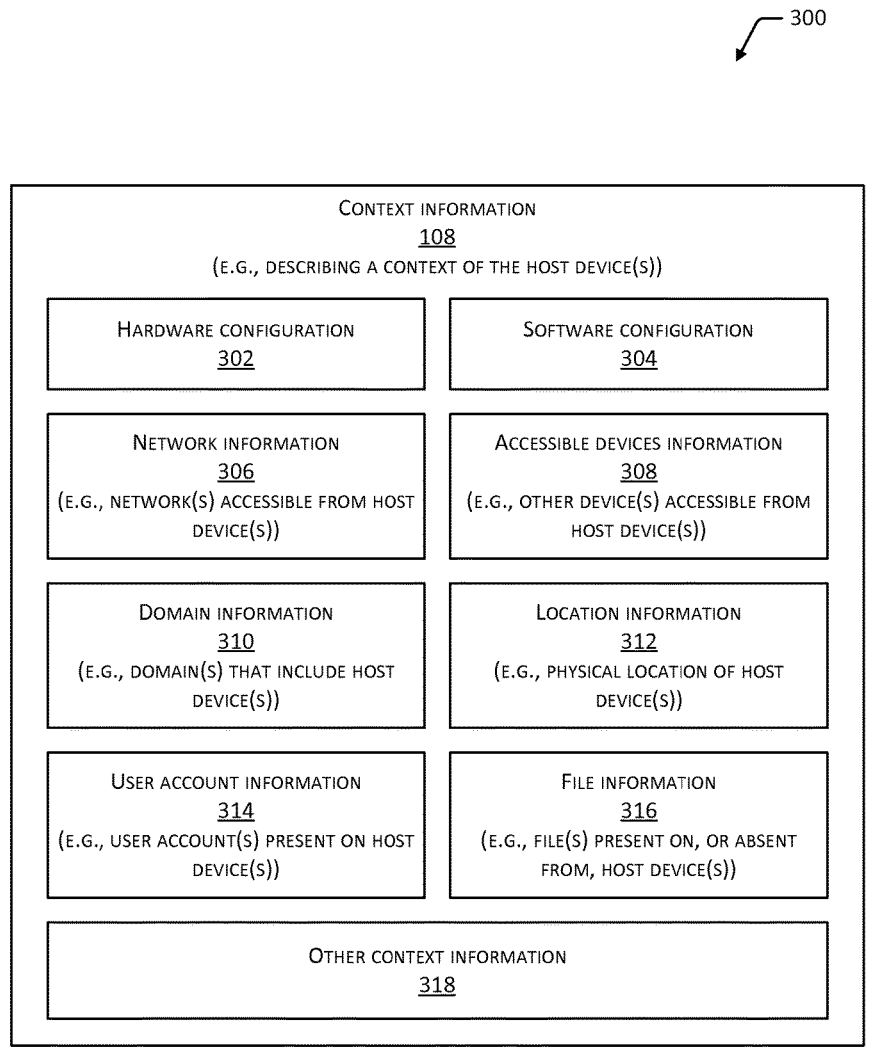
FIG. 3 depicts an example of context information employed to determine an environment in which the software module is executing.

FIG. 3 depicts an example 300 of the context information 108 employed to determine if the software module 104 is executing in an unauthorized environment. As shown in the example 300, the context information 108 may include a hardware configuration 302. The hardware configuration 302 may describe one or more hardware components of the host device 102 on which the software module 104 is executing, such as the number, type, manufacturer, model, speed, and other characteristics of the processor(s) of the host device 102. The hardware configuration 302 may also describe an amount or type of random access memory (RAM) or read-only memory (ROM) included in the host device 102. The hardware configuration 302 may also describe the manufacturer, model, or other characteristics of the host device 102. In some cases, if the hardware configuration 302 corresponds to a recognized configuration of an authorized host device 102, the defensive instruction(s) 106 or the context analysis module 204 may determine that the software module 104 is executing in an authorized environment. Alternatively, if the hardware configuration 302 does not correspond to a recognized configuration of an authorized host device 102, the defensive instruction(s) 106 or the context analysis module 204 may determine that the software module 104 is executing in an unauthorized environment.

The context information 108 may include a software configuration 304 of the host device 102. The software configuration 304 may describe one or more software components of the host device 102 on which the software module 104 is executing, such as the name, developer, version number, type, or other characteristics of the OS executing on the host device 102. The software configuration 304 may also describe one or more other modules that are executing, or otherwise present, on the host device 102. The software configuration 304 may describe any number of files that are stored in memory on the host device 102. In some cases, the software configuration 304 may include information such as a host name of the host device 102. In some cases, if the software configuration 304 corresponds to a recognized configuration of an authorized host device 102, the defensive instruction(s) 106 or the context analysis module 204 may determine that the software module 104 is executing in an authorized environment. Alternatively, if the software configuration 304 does not correspond to a recognized configuration of an authorized host device 102, the defensive instruction(s) 106 or the context analysis module 204 may determine that the software module 104 is executing in an unauthorized environment.

The context information 108 may include network information 306. The network information 306 may include any network identifier of the host device 102, or of a component of the host device 102, such as an IP address, a media access control (MAC) address, an Ethernet Hardware Address (EHA), and so forth. The network information 306 may also identify one or more wired or wireless networks that are accessible by the host device 102. For example, the network information 306 may include a service set identification (SSID) for each of one or more networks that are accessible to a network interface of the host device 102. In some cases, if the network information 306 describes network(s) that are accessible from an authorized environment, the defensive instruction(s) 106 or the context analysis module 204 may determine that the software module 104 is executing in an authorized environment. Alternatively, if the network information 306 describes network(s) other than those network(s) known to be accessible from an authorized environment, the defensive instruction(s) 106 or the context analysis module 204 may determine that the software module 104 is executing in an unauthorized environment.

The context information 108 may also include accessible devices information 308 identifying one or more other computing devices that are accessible from the host device 102 over one or more networks. The accessible devices information 308 may identify other computing devices by host name, IP address, MAC address, or other identifiers. In some cases, if the accessible devices information 308 describes device(s) that are accessible from an authorized environment, the defensive instruction(s) 106 or the context analysis module 204 may determine that the software module 104 is executing in an authorized environment. Alternatively, if the accessible devices information 308 describes device(s) other than those device(s) known to be accessible from an authorized environment, the defensive instruction(s) 106 or the context analysis module 204 may determine that the software module 104 is executing in an unauthorized environment.

The context information 108 may include domain information 310 describing one or more domains that include the host device 102. Each of the domain(s) described in the domain information 310 may comprise a group of computing devices. The domain(s) may include any number of administrative domains each managed via a user authentication service that maintains user credentials and controls user access to the devices in the domain. In some cases, if the domain information 310 describes domain(s) that are associated with an authorized environment, the defensive instruction(s) 106 or the context analysis module 204 may determine that the software module 104 is executing in an authorized environment. Alternatively, if the domain information 310 describes domain(s) other than those domain(s) associated with an authorized environment, the defensive instruction(s) 106 or the context analysis module 204 may determine that the software module 104 is executing in an unauthorized environment.

In some implementations, the context information 108 may include location information 312 describing, to any degree of specificity, a physical location of the host device 102. The host device 102 may include location sensor(s), transceiver(s), other hardware component(s), or other software component(s) configured to determine the location of the host device 102 using one or more of the following: an inertial navigation system, a dead-reckoning navigation system, a network positioning system, a radio position finding system, a satellite-based navigation system, an accelerometer system, a gyroscope system, and so forth. The satellite-based system may include one or more of a Global Positioning System (GPS) receiver, a Globalnaya Navigatsionnaya Sputnikovaya Sistema (GLONASS) receiver, a Galileo receiver, an Indian Regional Navigational Satellite System, and so forth. In some cases, if the location information 312 indicates a location that is associated with an authorized environment, the defensive instruction(s) 106 or the context analysis module 204 may determine that the software module 104 is executing in an authorized environment. Alternatively, if the location information 312 indicates a location that is not associated with an authorized environment, the defensive instruction(s) 106 or the context analysis module 204 may determine that the software module 104 is executing in an unauthorized environment.

The context information 108 may include user account information 314 describing one or more user accounts that are present on, or absent from, the host device 102. In some cases, if the user account information 314 describes account(s) associated with an authorized environment, the defensive instruction(s) 106 or the context analysis module 204 may determine that the software module 104 is executing in an authorized environment. Alternatively, if the user account information 314 describes account(s) other than those known to be associated with an authorized environment, the defensive instruction(s) 106 or the context analysis module 204 may determine that the software module 104 is executing in an unauthorized environment.

In some implementations, the context information 108 may include file information 316 describing one or more files present on, or absent from, the host device(s) 102. In some cases, the determination that the host device 102 is operating in an authorized environment may be based, at least in part, on the presence of a file such as a license file, a signature file, an authorization file, and so forth. The absence of such a file may indicate that the software module 104 is executing in an unauthorized environment.

The context information 108 may also include other context information 318 describing the host device 102 where the software module 104 is executing, or the environment that includes the host device 102.

Figure 4:
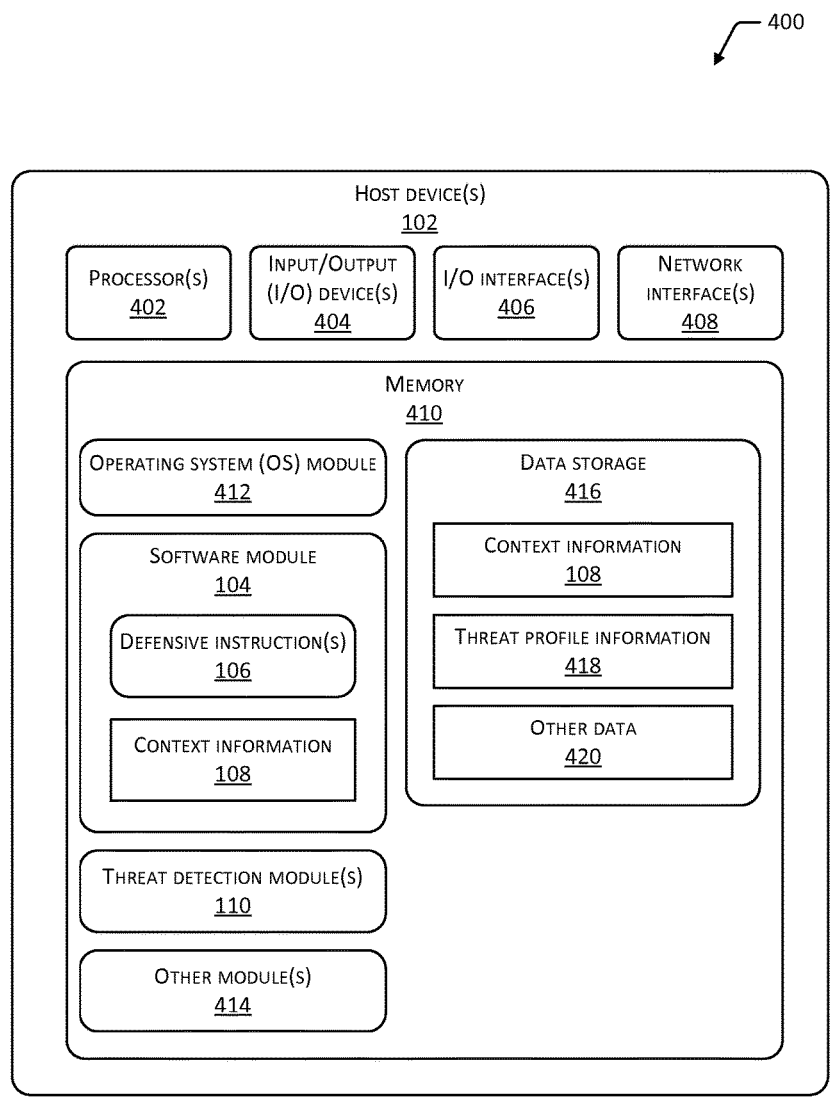
FIG. 4 depicts a block diagram of an example of host device(s) on which the software module may execute.

FIG. 4 depicts a block diagram 400 of an example of the host device(s) 102. As shown in the block diagram 400, the host device(s) 102 may include one or more processors 402 configured to execute one or more stored instructions. The processor(s) 402 may include hardware-based processor(s) 402, and may comprise one or more cores.

The host device(s) 102 may include one or more input/output (I/O) devices 404. The I/O device(s) 404 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include one or more output devices such as a display, an audio output device (e.g., a speaker), a printer, a haptic output device, and so forth. The I/O device(s) 404 may be physically incorporated with the host device(s) 102 or may be externally placed.

The host device(s) 102 may include one or more I/O interfaces 406 to enable components or modules of the host device(s) 102 to control, interface with, or otherwise communicate with the I/O device(s) 404. The I/O interface(s) 406 may enable information to be transferred in or out of the host device(s) 102, or between components of the host device(s) 102, through serial communication, parallel communication, or other types of communication. For example, the I/O interface(s) 406 may comply with a version of the RS-232 standard for serial ports, or with a version of the Institute of Electrical and Electronics Engineers (IEEE) 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The host device(s) 102 may also include one or more busses or other internal communications hardware or software that enables the transfer of data between the various modules and components of the host device(s) 102.

The host device(s) 102 may include one or more network interfaces 408 that enable communications between the host device(s) 102 and other network accessible computing devices, such as the server device(s) 202. The network interface(s) 408 may include one or more network interface controllers (NICs) or other types of transceiver devices configured to send and receive communications over one or more networks.

The host device(s) 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions describing data structures, program modules, processes, applications, or other data for the operation of the host device(s) 102. In some implementations, the memory 410 may provide storage of computer-readable instructions or other information in a non-transitory format.

The memory 410 may include an Operating System (OS) module 412. The OS module 412 may be configured to manage hardware resources such as the I/O device(s) 404, the I/O interface(s) 406, and the network interface(s) 408. The OS module 412 may also be configured to provide various services to applications, processes, or modules executed by the processor(s) 402. The OS module 412 may include one or more of the following: any version of the Linux OS; any version of iOS or OS X from Apple Corp. of Cupertino, Calif., USA; any version of Windows or Windows Mobile from Microsoft Corp. of Redmond, Wash., USA; any version of Android from Google Corp. of Mountain View, Calif., USA and its derivatives from various sources; any version of Palm OS from Palm Computing, Inc. of Sunnyvale, Calif., USA and its derivatives from various sources; any version of BlackBerry OS from Research In Motion Ltd. of Waterloo, Ontario, Canada; any version of VxWorks from Wind River Systems of Alameda, Calif., USA; or other operating systems.

The memory 410 may include one or more of the modules described above as executing on the host device(s) 102, such as one or more of the software module 104 or the threat detection module(s) 110. In cases where the software module 104 is a web application, the memory 410 may also include a web browser to execute the web application. The memory 410 may also include one or more other modules 414, such as a user authentication module or an access control module to secure access to the host device(s) 102, a cryptographic module to secure communications to and from the host device(s) 102, and so forth.

The memory 410 may include, or have access to, data storage 416 which stores data for operations of the host device(s) 102. The data storage 416 may comprise a file system, database, array, structured list, tree, or other data structure, and may be a relational or a non-relational datastore. The data storage 416 may store any of the information described above as being present on the host device(s) 102, such as the context information 108. In some cases, the data storage 416 may store threat profile information 418 that describes signature(s), behavior(s), or other characteristics of threats such as viruses, malware, bots, worms, or other malicious software. The threat detection module(s) 110 may employ the threat profile information 418 to determine whether the various module(s), including the software module 104, executing on the host device(s) 102 exhibit behaviors or signatures that are similar to previously characterized threats. The data storage 416 may also store other data 420 such as user authentication information, access control data, or other information. In some implementations, at least a portion of the information stored in the data storage 416 may be stored externally to the host device(s) 102, on other devices that may communicate with the host device(s) 102 via the I/O interface(s) 406 or via the network interface(s) 408.

Figure 5:
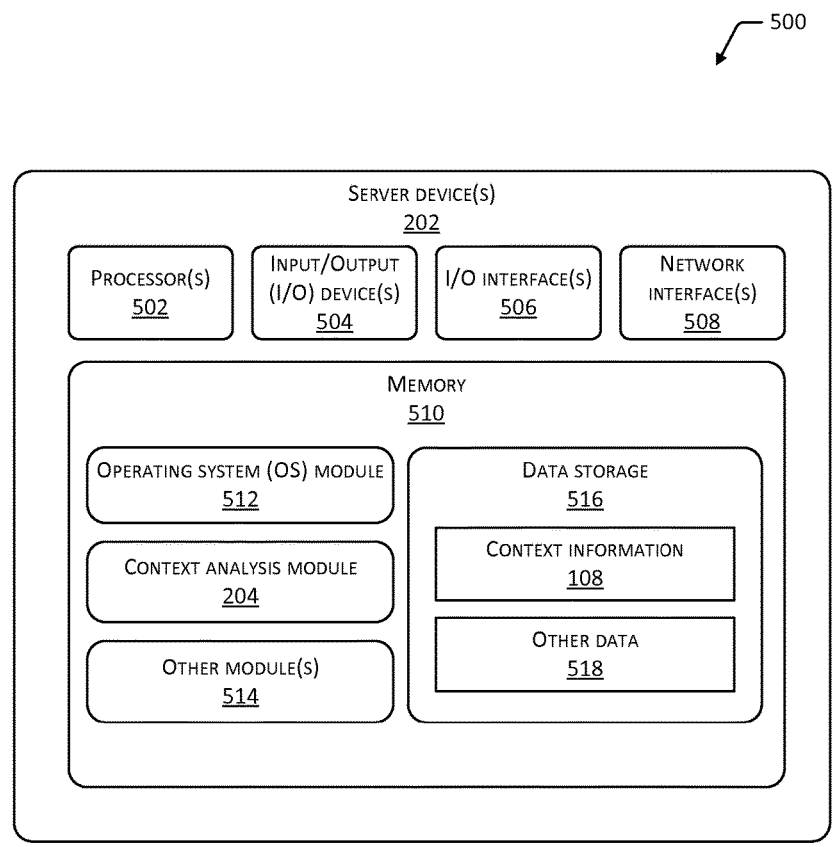
FIG. 5 depicts a block diagram of an example of server device(s) configured to analyze the context information and send a signal to the software module based on a determination that the software module is executing in an unauthorized environment.

FIG. 5 depicts a block diagram 500 of an example of the server device(s) 202. As shown in the block diagram 500, the server device(s) 202 may include one or more processors 502 (e.g., hardware-based processor(s)) configured to execute one or more stored instructions. The processor(s) 502 may comprise one or more cores. The server device(s) 202 may include one or more I/O devices 504, one or more I/O interfaces 506, and one or more network interfaces 508 as described above respectively with reference to the I/O device(s) 404, the I/O interface(s) 406, and the network interface(s) 408.

The server device(s) 202 may include one or more memories, described herein as memory 510. The memory 510 comprises one or more CRSM, as described above with reference to the memory 410. The memory 510 may include an OS module 512 that is configured to manage resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412.

The memory 510 may include one or more of the modules described above as executing on the server device(s) 202, such as the context analysis module 204. The memory 510 may also include one or more other modules 514, such as a user authentication module or an access control module to secure access to the server device(s) 202, a cryptographic module to secure communications to and from the server device(s) 202, and so forth.

The memory 510 may include data storage 516, which may store data for operations of the server device(s) 202. The data storage 516 may comprise a database, array, structured list, tree, or other data structure, and may be a relational or a non-relational datastore. The data storage 516 may store data such as that described above as present on the server device(s) 202, including the context information 108. The data storage 516 may also store other data 518, such as user authentication information or access control data. In some implementations, at least a portion of the information stored in the data storage 516 may be stored externally to the server device(s) 202 on other devices that may communicate with the server device(s) 202 via the I/O interface(s) 506 or via the network interface(s) 508.

Figure 6:
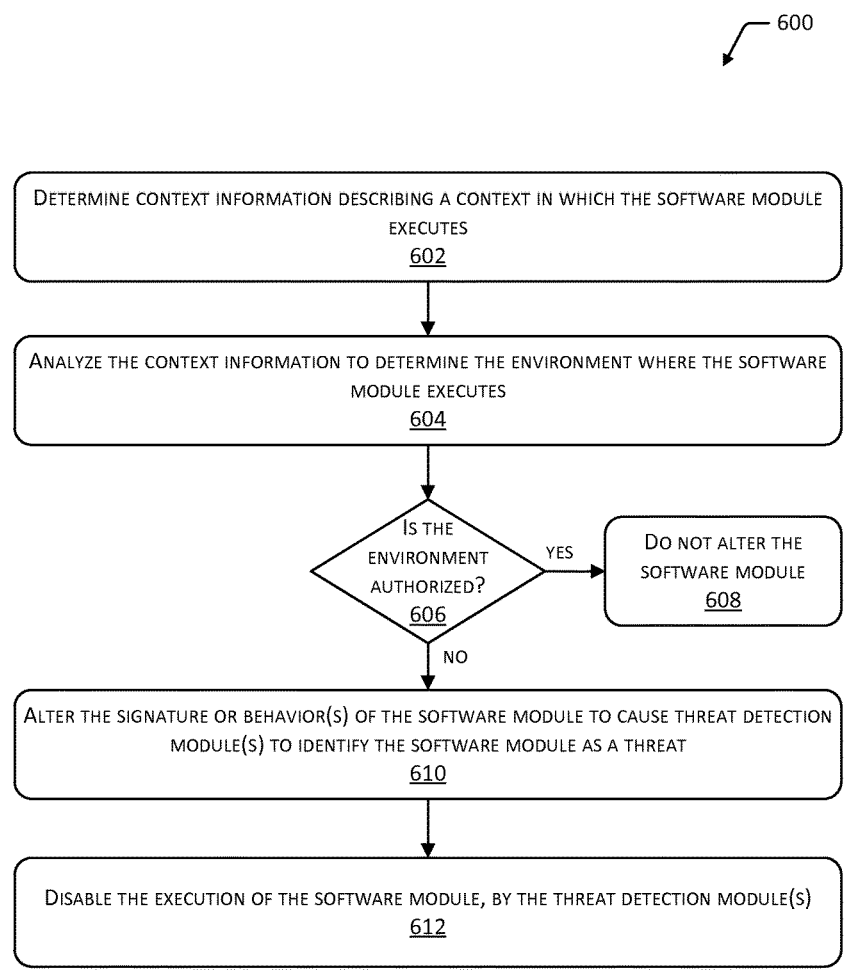
FIG. 6 depicts a flow diagram of a process for activating defensive measures to simulate a threat if context information indicates that the software module is executing in an unauthorized environment.

FIG. 6 depicts a flow diagram 600 of a process for activating defensive measures that cause a software module 104 to simulate a threat if the context information 108 indicates that the software module 104 is executing in an unauthorized environment. Operations of the process may be performed by one or more of the software module 104, the defensive instruction(s) 106, the threat detection module(s) 110, the other module(s) 414 executing on the host device(s) 102, or other modules executing on other device(s).

At 602, the defensive instruction(s) 106, another portion of the software module 104, or another module may determine the context information 108 describing a context in which the software module 104 executes. In some implementations, the context information 108 may be determined while the software module 104 is executing. Alternatively, the context information 108 may be determined at a time that is non-contemporaneous with the execution of the software module 104.

At 604, the context information 108 may be analyzed to determine the environment that includes the host device 102 where the software module 104 executes.

Based on the context information 108, at 606 a determination may be made whether the environment is authorized or unauthorized for executing the software module 104. If the environment is authorized, the process may proceed to 608 and the software module 104 may execute in its normal state without alteration of either its behavior(s) or its signature. If the environment is unauthorized, the process may proceed to 610. At 610, the defensive instruction(s) 106 may execute to alter one or more of the signature or the behavior(s) of the software module 104, thus causing the threat detection module(s) 110 to identify the software module 104 as a threat.

At 612, the threat detection module(s) 110 may disable the software module 104 based on the identification of the software module 104 as a threat. The threat detection module(s) 110 may also quarantine, delete, or stop execution of the software module 104. In some cases, the threat detection module(s) 110 may send an alert or other notification that prompts an operator to perform actions to disable, delete, quarantine, or stop the software module 104.

Figure 7:
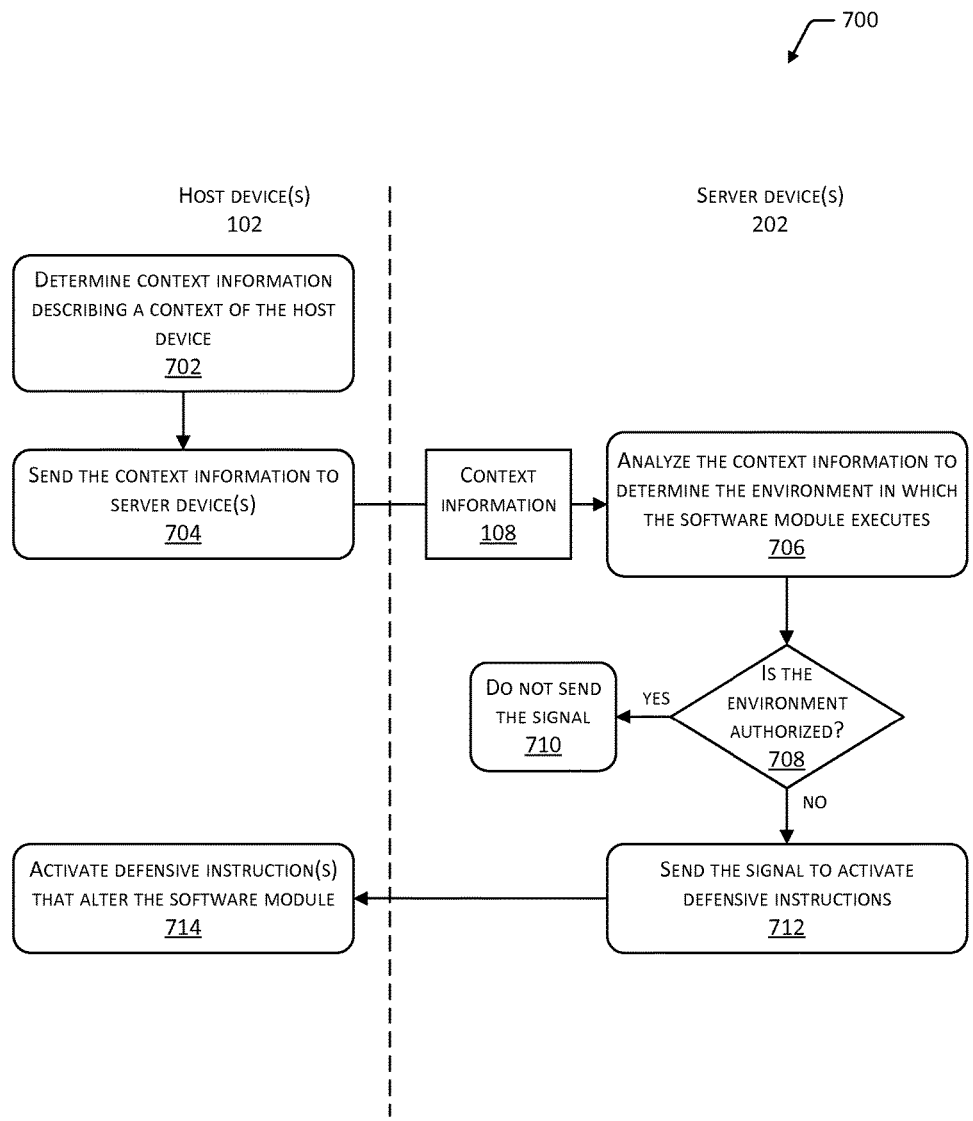
FIG. 7 depicts a flow diagram of a process for activating defensive measures to simulate a threat in response to a signal sent from server device(s).

FIG. 7 depicts a flow diagram 700 of a process for activating defensive measures in a software module 104 to simulate a threat in response to a signal 206 sent from the server device(s) 202. Operations of the process may be performed by one or more of the software module 104, the defensive instruction(s) 106, the threat detection module(s) 110, the other module(s) 414 executing on the host device(s) 102, the context analysis module 204, the other module(s) 514 executing on the server device(s) 202, or other modules executing on other device(s).

At 702, the context information 108 may be determined as described above with reference to 602. At 704, the context information 108 may be sent to the server device(s) 202.

At 706, the context analysis module 204 may analyze the context information 108 to determine the environment in which the software module 104 executes, as described above.

Based on the context information 108, at 708 a determination may be made whether the environment is authorized or unauthorized for executing the software module 104. If the environment is authorized, the process may proceed to 710 and not send the signal 206, thus enabling the software module 104 to execute in its normal state without alteration of either its behavior(s) or its signature. If the environment is unauthorized, the process may proceed to 712. At 712, the signal 206 may be sent to the host device(s) 102.

At 714, on receiving the signal 206, the defensive instruction(s) 106 may execute to alter one or more of the signature or the behavior(s) of the software module 104, thus causing the threat detection module(s) 110 to disable the execution of the software module 104.

In some implementations, a signal 206 may be sent to the host device(s) 102 if the environment is authorized. In such cases, the defensive instruction(s) 106 may execute to alter one or more of the signature or the behavior(s) of the software module 104 if the defensive instruction(s) 106 do not receive the signal 206 within a threshold time period after sending the context information 108 to the server device(s) 202.

In some implementations, the context information 108 may be collected by one or more devices other than the host device(s) 102 or the server device(s) 202. For example, the context information 108 may be collected by a router, a firewall, or other network appliance, which may send the context information 108 to the server device(s) 202 for analysis. Moreover, in some cases, the server device(s) 202 may request the context information 108 from the host device(s) 102, which may respond to the request by sending the context information 108 to the server device(s) 202.

In some implementations, the server device(s) 202 and the host device(s) 102 may be virtualizations executing within a same virtual computing environment, hypervisor, emulation, or virtual machine that executes on one or more physical computing devices. Alternatively, the server device(s) 202 and the host device(s) 102 may execute in separate virtual computing environments, hypervisors, emulations, or virtual machines executing on one or more physical computing devices. In some implementations, the server device(s) 202, or the module(s) of the server device(s) 202, may execute within a trusted platform module (TPM) of the host device(s) 102.

Figure 8:
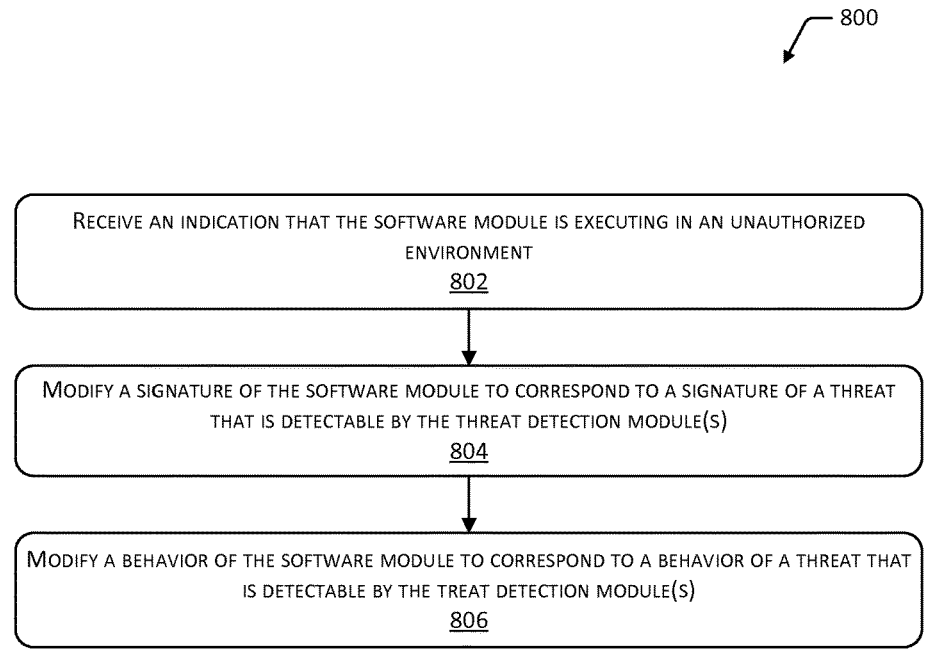
FIG. 8 depicts a flow diagram of a process for simulating a threat by modifying one or more of the behavior(s) or the signature of a software module.

FIG. 8 depicts a flow diagram 800 of a process for simulating a threat by modifying one or more of the behavior(s) or the signature of a software module 104. Operations of the process may be performed by one or more of the software module 104, the defensive instruction(s) 106, the threat detection module(s) 110, the other module(s) 414 executing on the host device(s) 102, or other modules executing on other device(s).

At 802, an indication may be received that the software module 104 is executing in an unauthorized environment. As described above, the indication may be based on an analysis of the context information 108 by the defensive instruction(s) 106 or another portion of the software module 104. Alternatively, the indication may be via a signal 206 that is sent from the server device(s) 202 based on the analysis of the context information 108 by the context analysis module 204.

At 804, at least a portion of the signature of the software module 104 may be modified to correspond to at least a portion of the signature of a threat that is detectable by the threat detection module(s) 110. The modification of the signature may include incorporating (e.g., injecting) one or more instructions into the instructions of the software module 104. The modification may also include incorporating one or more strings, binary sequences, or other data into the executable software module 104. The modification of the signature may include modifying the active memory employed by the software module 104 during its execution. The modification of the signature may also include modifying the executable software module 104 while it is stored in persistent memory on the host device(s) 102, such as a hard drive or other storage device. In some implementations, the memory layout of the software module 104 may be modified to create the appearance that the software module 104 has loaded malicious libraries or other code that may prompt the threat detection module(s) 110 to identify the software module 104 as a threat. In some operating systems, such as OS X, the application file for a software module 104 may include a directory comprising multiple files employed to execute the software module 104. In such cases, the modification of the signature may include writing new file(s) into the directory to cause the threat detection module(s) 110 to identify the software module 104 as a threat. Modification of the signature may also include adding new file(s) to, or otherwise modifying, a Web Application Archive (WAR), Java Archive (JAR), or other archive file that includes, or is associated with, the software module 104.

At 806, one or more behaviors of the software module 104 may be modified to correspond to behavior(s) of a threat that is detectable by the threat detection module(s) 110. The modified behaviors may include, but are not limited to, one or more of the behaviors described above with reference to FIG. 1. Implementations may alter the signature of the software module 104, the behavior(s) of the software module 104, or both the signature and the behavior(s) to prompt the threat detection module(s) 110 to disable the execution of the software module 104.

Figure 9:
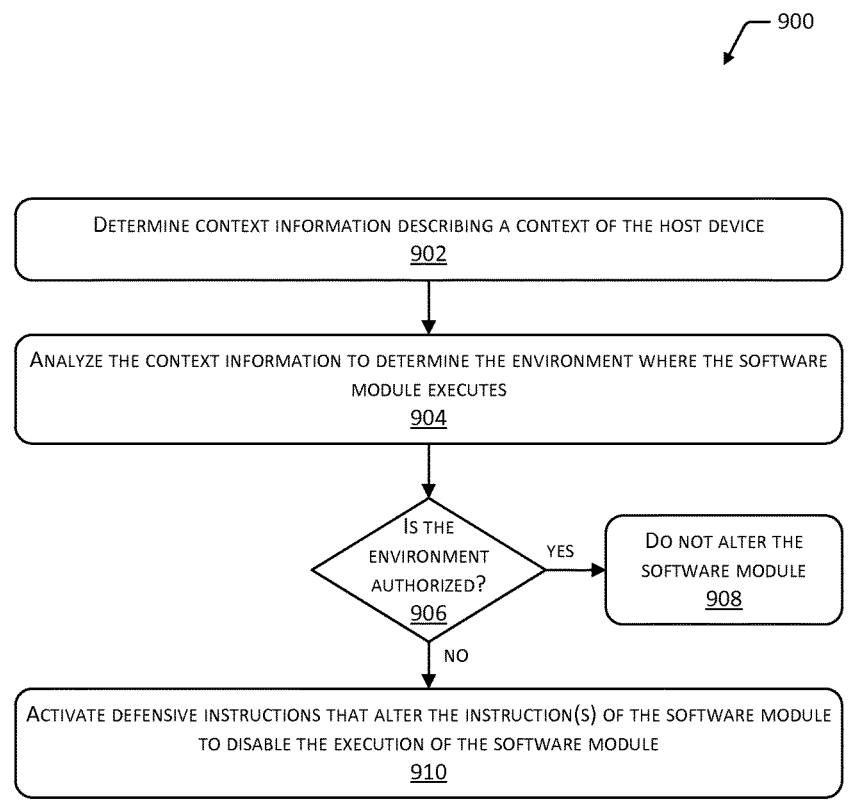
FIG. 9 depicts a flow diagram of a process for activating defensive measures to alter the instruction(s) of the software module to prevent the software module from executing if context information indicates that the software module is executing in an unauthorized environment.

FIG. 9 depicts a flow diagram 900 of a process for activating defensive measures to alter the instruction(s) of the software module 104 to prevent the software module 104 from executing if the context information 108 indicates that the software module 104 is executing in an unauthorized environment. Operations of the process may be performed by one or more of the software module 104, the defensive instruction(s) 106, the threat detection module(s) 110, the other module(s) 414 executing on the host device(s) 102, or other modules executing on other device(s).

At 902, the context information 108 may be determined as described with reference to 602.

At 904, the context information 108 may be analyzed to determine the environment that includes the host device 102 where the software module 104 executes.

Based on the context information 108, at 906 a determination may be made whether the environment is authorized or unauthorized for executing the software module 104. If the environment is authorized, the process may proceed to 908 and the software module 104 may execute in its normal state without alteration. If the environment is unauthorized, the process may proceed to 910. At 910, the defensive instruction(s) 106 may execute to alter the instruction(s) of the software module 104. The instruction(s) may be altered to remove one or more instructions, overwrite or modify one or more instructions, or add one or more instructions. Such alterations may corrupt the executable software module 104 to an extent such that the software module 104 is rendered non-executable. The operations described with reference to FIG. 9 may be performed in addition to, or instead of, the other operation(s) performed by the defensive instruction(s) 106 to cause the threat detection module(s) 110 to identify the software module 104 as a threat.

Although the examples above describe modifying the software module 104 at runtime based on a determination that the software module 104 is executing in an unauthorized environment, implementations are not so limited. In some implementations, the software module 104 may be written, built, or otherwise configured to imitate a threat such as a virus or malware. The software module 104 may be so configured by including a portion of the signature of the threat in the executable software module 104, or by writing the software module 104 to exhibit one or more behavior(s) that are characteristic of the threat. Accordingly, the software module 104 may imitate the threat without any modification by the defensive instruction(s) 106, causing the threat detection module(s) 110 in the unauthorized environment to disable the software module 104. However, the threat detection module(s) 110 executing on host device(s) 102 within an authorized environment may be configured such that the threat detection module(s) 110 do not recognize the imitated threat. For example, the threat may be placed on a white list of allowed processes detected by the threat detection module(s) 110.

In some implementations, the defensive instruction(s) 106 may cause the software module 104 to behave polymorphically based on the detected execution environment. For example, the defensive instruction(s) 106 may be triggered based on a determination that the environment is unauthorized, but the defensive instruction(s) 106 may not be triggered based on a determination that the environment is a controlled, monitored, or test environment such as a sandbox within the unauthorized environment. Malicious parties may attempt to place the software module 104 in a controlled, monitored, or test environment to investigate why the software module 104 is disabled by the threat detection module(s) 110. Because the defensive instruction(s) 106 may operate differently in a sandbox relative to the unauthorized environment generally, implementations may inhibit investigations of the defensive measures built into the software module 104. Moreover, in some implementations the defensive instruction(s) 106 may be encrypted or obfuscated to frustrate potential investigations into the defensive measures. In such cases, the software module 104 may be built to include the key for decryption or de-obfuscation of the defensive instruction(s) 106 by authorized parties.

In some implementations, a service may be offered to incorporate the defensive instruction(s) 106 into the software module 104. For example, a software developer or other customer may provide the software module 104 to a service. The software module 104 may be provided as source code to be built, or as executable code. The service may then instrument or otherwise modify the software module 104 to include the defensive instruction(s) 106 that enable the defensive actions to be performed when the software module 104 is in an unauthorized environment. The modified software module 104 may then be provided to the customer.

Moreover, in some implementations the threat detection module(s) 110, or threat profile information used by the threat detection module(s) 110, may be modified to characterize the software module 104 as a threat. For example, threat profile information employed by the threat detection module(s) 110 may be modified to include the signature, the name, or other information that is characteristic of the of the software module 104, enabling the threat detection module(s) 110 to identify the software module 104 as a threat even if the software module 104 has not been instrumented to include the defensive instruction(s) 106.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art.

It is intended that the present disclosure encompass such changes and modifications that fall within the scope of the appended claims.

What is claimed is:

1. A computer-implemented method, comprising:
during execution of a software module on a host device, collecting context information indicative of:
network information describing at least one network that is accessible by the software module;
accessible device information describing at least one other device that is accessible by the software module;
a configuration of the software module, and
a configuration of the host device;
comparing the context information collected during execution of the software module to context information known to be associated with an environment authorized for execution of the software module;
based on the comparing the context information collected during execution of the software module to the context information known to be associated with the environment authorized for execution of the software module, determining that the software module is executing in an environment unauthorized for execution of the software module;
upon determining the software module is executing in an environment unauthorized for execution of the software module, executing defensive instructions that are included in the software module to alter the software module to simulate a threat, the altering of the software module including one or more of:
modifying at least a portion of a signature of the software module to correspond to at least a portion of a threat signature of the threat that is detectable by a threat detection module; and
modifying at least one behavior of the software module to correspond to a threat behavior of the threat that is detectable by the threat detection module;
upon executing the defensive instructions, identifying the software module as the threat by the threat detection module; and
disabling the execution of the software module on the host device based on the software module being identified as the threat.

2. The method of claim 1, wherein the context information collected during execution of the software module further comprises one or more of:
a hardware configuration of the host device executing the software module;
a software configuration of the software module;
domain information describing at least one domain the software module is operating in;
location information describing a location of the host device executing the software module;
user account information describing at least one user account present on the host device executing the software module; or
file information describing at least one file that is present on the host device executing the software module.

3. The method of claim 1, wherein the modifying of the at least portion of the signature of the software module further comprises one or more of:
incorporating a text string into the signature of the software module, or
incorporating a binary sequence into the signature of the software module.

4. The method of claim 1, wherein the modifying of the at least one behavior causes the software module to perform one or more of:
attempting to access data stored on the host device,
attempting to delete data stored on the host device,
attempting to change a privilege of the software module,
attempting to change a user privilege on the host device,
attempting to access a process that is executable on the host device,
attempting to connect to an external device over a network,
attempting to perform a system call on the host device,
attempting to modify a system configuration of the host device,
attempting to access a security credential, or
attempting to modify the threat detection module.

5. The method of claim 1, wherein the threat detection module includes one or more of:
an anti-virus software module,
an anti-malware software module,
a firewall, or
an intrusion detection system.

6. A system, comprising:
at least one computing device configured to implement one or more services, the one or more services configured to:
access context information describing an environment in which a software module is executing on a host device, the software module including one or more defensive instructions, wherein the environment in which the software module is executing on the host device comprises one or more of:
at least network information describing at least one network that is accessible by the software module executing on a host device; or
accessible devices information describing at least one other device that is accessible by the software module;
compare the accessed context information describing the environment in which the software module is executing on the host device to context information known to be associated with an environment authorized for execution of the software module;
based on comparing the accessed context information describing the environment in which the software module is executing on the host device to the context information known to be associated with the environment authorized for execution of the software module, determine that the host device is included in an environment that is unauthorized for executing the software module;
upon determining the host device is included in an environment that is unauthorized for executing the software module, send, to the software module, a signal configured to cause the one or more defensive instructions included in the software module to alter the software module to execute one or more additional executable instructions that simulate a threat;
identify, by a threat detection module, that the software module is simulating the threat; and
disable the execution of the software module on the host device based on the software module being identified as the threat.

7. The system of claim 6, wherein:
the alteration of the software module further includes modifying at least a portion of a signature of the software module to correspond to at least a portion of a threat signature of a threat that is detectable by the threat detection module; and the modifying of the at least portion of the signature further comprises one or more of:

incorporating a string into the signature of the software module; or modifying a memory layout of the software module.

8. The system of claim 6, wherein:

the signal is a first signal; and the one or more services are further configured to:

based on comparing the accessed context information describing the environment in which the software module is executing on the host device to the context information known to be associated with the environment authorized for execution of the software module, determine that the host device is included in an environment that is authorized for executing the software module; and send, to the software module, a second signal configured to cause the one or more defensive instructions to not alter the software module.

9. The system of claim 6, wherein:

the alteration of the software module further includes modifying at least one behavior of the software module to correspond to a threat behavior of a threat that is detectable by the threat detection module; and the modifying of the at least one behavior causes the software module to perform one or more of:

attempting to access data stored on the host device, attempting to delete data stored on the host device, attempting to change a privilege of the software module, attempting to change a user privilege on the host device, attempting to access a process that is executable on the host device, attempting to connect to an external device over a network, attempting to perform a system call on the host device, attempting to modify a system configuration of the host device, attempting to access a security credential, or attempting to modify the threat detection module.

10. The system of claim 6, wherein the accessed context information describing the environment in which the software module is executing on the host device further comprises one or more of:

a hardware configuration of the host device;

a software configuration of the host device;

domain information describing at least one domain that includes the host device;

location information describing a location of the host device;

user account information describing at least one user account present on the host device; or file information describing at least one file that is present on the host device.

11. The system of claim 6, wherein the altering of the software module further includes one or more of:

altering at least a portion of active memory employed by the software module during execution; or altering at least a portion of the software module stored in persistent memory.

12. The system of claim 6, wherein the threat detection module includes one or more of:

an anti-virus software module, an anti-malware software module, a firewall, or an intrusion detection system.

13. The system of claim 6, wherein:

the accessed context information is generated by the software module during the execution; and the accessed context information is sent to the one or more services by the software module during the execution.

14. One or more non-transitory computer-readable media storing instructions which, when executed by at least one processor, instructs the at least one processor to:

determine context information describing an environment in which a software module is executing on a host device, wherein the environment comprises one or more of:

network information describing at least one network that is accessible from the host device, or accessible device information describing at least one other device that is accessible from the host device;

compare the determined context information describing the environment in which the software module is executing on the host device to context information known to be associated with an environment authorized for execution of the software module;

based on comparing the determined context information describing the environment in which the software module is executing on the host device to the context information known to be associated with the environment authorized for execution of the software module, determine that the host device is included in an environment that is unauthorized for executing the software module; and upon determining the host device is included in an environment that is unauthorized for executing the software module, alter the software module to simulate a threat identified by a threat detection module as the threat and cause the threat detection module to perform actions to disable the execution of the software module on the host device, wherein the altering of the software module includes at least executing one or more additional executable instructions included in the software module that correspond to the threat.

15. The one or more non-transitory computer-readable media of claim 14, wherein the altering of the software module to cause the threat detection module to perform one or more actions responsive to the threat detection module identifying the software module as the threat, the one or more actions further includes one or more of:

quarantining the software module;

deleting the software module; or terminating execution of the software module.

16. The one or more non-transitory computer-readable media of claim 14, wherein:

the executing of the one or more additional executable instructions comprises modifying at least a portion of a signature of the software module to correspond to at least a portion of a threat signature of the threat that is detectable by the threat detection module; and the modifying of the at least portion of the signature further comprises one or more of:

incorporating a string into the signature of the software module; or modifying a memory layout of the software module.

17. The one or more non-transitory computer-readable media of claim 14, wherein:

the executing of the one or more additional executable instructions comprises modifying at least one behavior of the software module to correspond to a threat behavior of the threat that is detectable by the threat detection module; and the modifying of the at least one behavior causes the software module to perform one or more of:
attempting to access data stored on the host device,
attempting to delete data stored on the host device,
attempting to change a privilege of the software module,
attempting to change a user privilege on the host device,
attempting to access a process that is executable on the host device,
attempting to connect to an external device over a network,
attempting to perform a system call on the host device,
attempting to modify a system configuration of the host device,
attempting to access a security credential, or
attempting to modify the threat detection module.

18. The one or more non-transitory computer-readable media of claim 14, wherein the executing of the one or more additional executable instructions disables execution of the software module by performing one or more of:
altering at least one of the instructions; or
deleting the at least one of the instructions.

19. The one or more non-transitory computer-readable media of claim 14, wherein the determined context information describing the environment in which the software module is executing on the host device further comprises one or more of:
a hardware configuration of the host device;
a software configuration of the host device;
domain information describing at least one domain that includes the host device;
location information describing a location of the host device;
user account information describing at least one user account present on the host device; or
file information describing at least one file that is present on the host device.

20. The one or more non-transitory computer-readable media of claim 14, wherein the executing of the one or more additional executable instructions comprises one or more of:
altering at least a portion of active memory employed by the software module during execution; or
altering at least a portion of the software module stored in persistent memory.

* * * * *